(12) United States Patent
Morrison et al.

(10) Patent No.: US 11,168,711 B2
(45) Date of Patent: Nov. 9, 2021

(54) HYDRAULIC SYSTEM FOR A MULTI-FUNCTION MACHINE

(71) Applicant: DEERE & COMPANY, Moline, IL (US)

(72) Inventors: Thomas D. Morrison, Bettendorf, IA (US); Austin J. Karst, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 139 days.

(21) Appl. No.: 16/662,093

(22) Filed: Oct. 24, 2019

(65) Prior Publication Data
US 2021/0123461 A1   Apr. 29, 2021

(51) Int. Cl.
*F15B 11/17*  (2006.01)
*A01D 41/14*  (2006.01)

(52) U.S. Cl.
CPC ............ *F15B 11/17* (2013.01); *A01D 41/145* (2013.01)

(58) Field of Classification Search
CPC ...................................................... F15B 11/17
See application file for complete search history.

(56) References Cited

U.S. PATENT DOCUMENTS

| | | | |
|---|---|---|---|
| 3,469,381 A | 9/1969 | Burrough et al. | |
| 3,535,877 A * | 10/1970 | Lanson | E02F 9/2292 60/422 |
| 4,558,629 A * | 12/1985 | Unger | F15B 11/17 60/486 |
| 5,081,837 A * | 1/1992 | Ueno | E02F 9/2239 60/421 |
| 5,289,680 A * | 3/1994 | Obe | F15B 11/17 60/421 |
| 7,168,226 B2 | 1/2007 | McLean et al. | |
| 7,401,465 B2 * | 7/2008 | Emmert | F15B 11/17 60/430 |
| 8,001,751 B2 | 8/2011 | Ehrhart et al. | |
| 10,041,508 B2 * | 8/2018 | Schmollngruber | F15B 11/166 |
| 10,428,491 B2 * | 10/2019 | Joung | E02F 9/2282 |
| 2004/0208754 A1 * | 10/2004 | McFadden | F15B 11/17 417/286 |
| 2014/0283676 A1 * | 9/2014 | Beschorner | E02F 9/2217 91/418 |
| 2016/0017898 A1 * | 1/2016 | Kanenawa | F15B 11/165 60/468 |

FOREIGN PATENT DOCUMENTS

DE        3222106 A1 *  12/1983  .............. F15B 11/17

* cited by examiner

*Primary Examiner* — Michael Leslie

(57) ABSTRACT

A hydraulic system includes a first fixed displacement pump having a first pump output and a second fixed displacement pump having a second pump output. A first actuator requires a first required flow rate to perform a first function. A second actuator requires a second required flow rate to perform a second function. A combined flow control valve is controllable between a first state connecting fluid communication between the first fixed displacement pump and the tank so that only the second pump output is directed to the second actuator, and a second state disconnecting fluid communication between the first fixed displacement pump and the tank to combine the first pump output and the second pump output such that the combined first pump output and the second pump output is directed to the first actuator.

18 Claims, 6 Drawing Sheets

HYDRAULIC SYSTEM FOR A MULTI-FUNCTION MACHINE

TECHNICAL FIELD

The disclosure generally relates to a hydraulic system for a machine, and particularly to an agricultural machine such as a windrower.

BACKGROUND

Many different work machines, such as but not limited to a windrower, include a hydraulic system for operating multiple actuators for performing multiple different functions. The actuators may include, but are not limited to, extendable and/or retractable cylinders, motors, or some other hydraulically actuated devices. Each actuator may require a different fluid flow rate to perform its designated function. The required fluid flow rate for each actuator is dependent upon the specific type of actuator and the function to be performed. For example, a windrower may include a first hydraulic cylinder for lifting a cutter head, i.e., a lift cylinder, and a second hydraulic cylinder for tilting the cutter head, i.e., a tilt cylinder. Because the lift cylinder must do more work than the tilt cylinder, the lift cylinder may be sized larger and require a larger fluid flow rate to perform its designated function relative to the tilt cylinder.

Often, the work machine includes a single, fixed displacement hydraulic pump to provide the required fluid flow rate to all of the multiple actuators. As such, the single fixed displacement pump must be sized to provide the required flow for the actuator having the largest fluid requirement. When the hydraulic system is not operating that actuator, the excess hydraulic fluid is forced through a restriction, e.g., an orifice, to drive the excess hydraulic fluid flow through a pressure relief valve and back to a tank. This consumes power and adds heat to the fluid, thereby decreasing the efficiency of the hydraulic system and the machine.

SUMMARY

A hydraulic system for an agricultural machine, e.g., a windrower, is provided. The hydraulic system includes a tank for storing a fluid, and a pressure source for pressurizing and circulating the fluid through the hydraulic system. The hydraulic system further includes a first fixed displacement pump having a first pump output, and a second fixed displacement pump having a second pump output. A first actuator includes a first required flow rate to perform a first function, and a second actuator includes a second required flow rate to perform a second function. The first required flow rate is greater than the second required flow rate. A combined flow control valve is controllable between a first state and a second state. When the combined flow control valve is disposed in the first state, the combined flow control valve is configured to separate the first pump output and the second pump output, such that only the second pump output is directed to the second actuator to provide the second required flow rate for the second function of the second actuator. When the combined flow control valve is disposed in the second state, the combined flow control valve is configured to combine the first pump output and the second pump output, such that the combined first pump output and the second pump output is directed to the first actuator to provide the first required flow rate for the first function of the first actuator.

In one aspect of the disclosure, the first pump output is greater than the second pump output. For example, the first pump output may be approximately equal to 23 cc, whereas the second pump output may be approximately equal to 10 cc. In another aspect of the disclosure, the first required flow rate is greater than the second pump output, and the second required flow rate is less than the second pump output. For example, the first required flow rate may be approximately equal to 33 cc, whereas the second required flow rate is approximately equal to 5 cc.

In one aspect of the disclosure, the combined flow control valve connects fluid communication between the first fixed displacement pump and the tank when the combined flow control valve is disposed in the first state. When fluid communication is connected between the tank and the first fixed displacement pump, the first pump output is directed to the tank and is therefore not available to supply the first actuator and/or the second actuator with fluid. The combined flow control valve disconnects fluid communication between the first fixed displacement pump and the tank when the combined flow control valve is disposed in the second state. When fluid communication is disconnected between the tank and the first fixed displacement pump, i.e., blocked, then the first pump output is forced through the hydraulic system and may be used to supply the first actuator and/or the second actuator with fluid.

In another aspect of the disclosure, the hydraulic system includes a first actuator apply valve disposed between the second fixed displacement pump and the first actuator. The first actuator apply valve is controllable between a first state blocking fluid communication in a direction moving from the first actuator toward the second fixed displacement pump, and a second state allowing fluid communication between the second fixed displacement pump and the first actuator. A fluid passage interconnects the first actuator apply valve and the first actuator in fluid communication.

In one embodiment of the disclosure, the combined flow control valve includes a hydraulic actuated pilot. A pilot supply line interconnects the fluid passage and the hydraulic actuated pilot of the combined flow control valve. When the first actuator apply valve is disposed in its second state, a portion of the second pump output flows through the pilot supply line to the hydraulic actuated pilot of the combined flow control valve to actuate the combined flow control valve into its second state, thereby allowing the first pump output to combine with the second pump output. Accordingly, a portion of the second pump output that is directed toward the first actuator via the first actuator apply valve is used to actuate the combined flow control valve to direct the first pump output toward the first actuator.

In another aspect of the disclosure, a flow controller may be disposed within the pilot supply line. The flow controller may include one of, but is not limited to, an orifice restriction or a variable flow control valve. The flow controller restricts fluid flow through the pilot supply line to slow the movement of the hydraulic actuated pilot of the combined flow control valve so that the first pump output is combined with the second pump output over a pre-defined period of time, thereby providing a damped response that minimizes jerks and/or pulses in the hydraulic system and/or machine.

In another aspect of the disclosure, a check valve is disposed between the first fixed displacement pump and the first actuator. The check valve is operable to allow fluid flow in a direction moving from the first fixed displacement pump toward the first actuator. The check valve is operable to block fluid flow in a direction moving from the first actuator toward the first fixed displacement pump. The check valve prevents fluid from the second fixed displacement pump from flowing to the tank via the combined flow control valve.

In another aspect of the disclosure, a second pump exhaust valve is controllable between a first state and a second state. When the second pump exhaust valve is disposed in the first state, the second pump exhaust valve connects fluid communication between the second fixed displacement pump and the tank. When the second pump exhaust valve is disposed in the second state, the second pump exhaust valve blocks fluid communication between the second fixed displacement pump and the tank in a direction moving from the second fixed displacement pump toward the tank. As such, the second pump exhaust valve may be controlled into the first state to dump the fluid from the second fixed displacement pump to the tank. For example, if no actuators are being activated, then the second pump exhaust valve may be commanded to its first state, and the combined flow control valve may be controlled to its first state, such that the fluid output from both the second fixed displacement pump and the first fixed displacement pump is directed to the tank, and not forced through a pressure relief valve.

In one embodiment of the disclosure, the combined flow control valve includes a variable electro/hydraulic controlled position valve that is electronically controlled to change the operating state of the combined flow control valve.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "substantially" or "approximately" are understood by those of ordinary skill to refer to reasonable ranges outside of the given value, for example, general tolerances associated with manufacturing, assembly, and use of the described embodiments.

Figure 1:
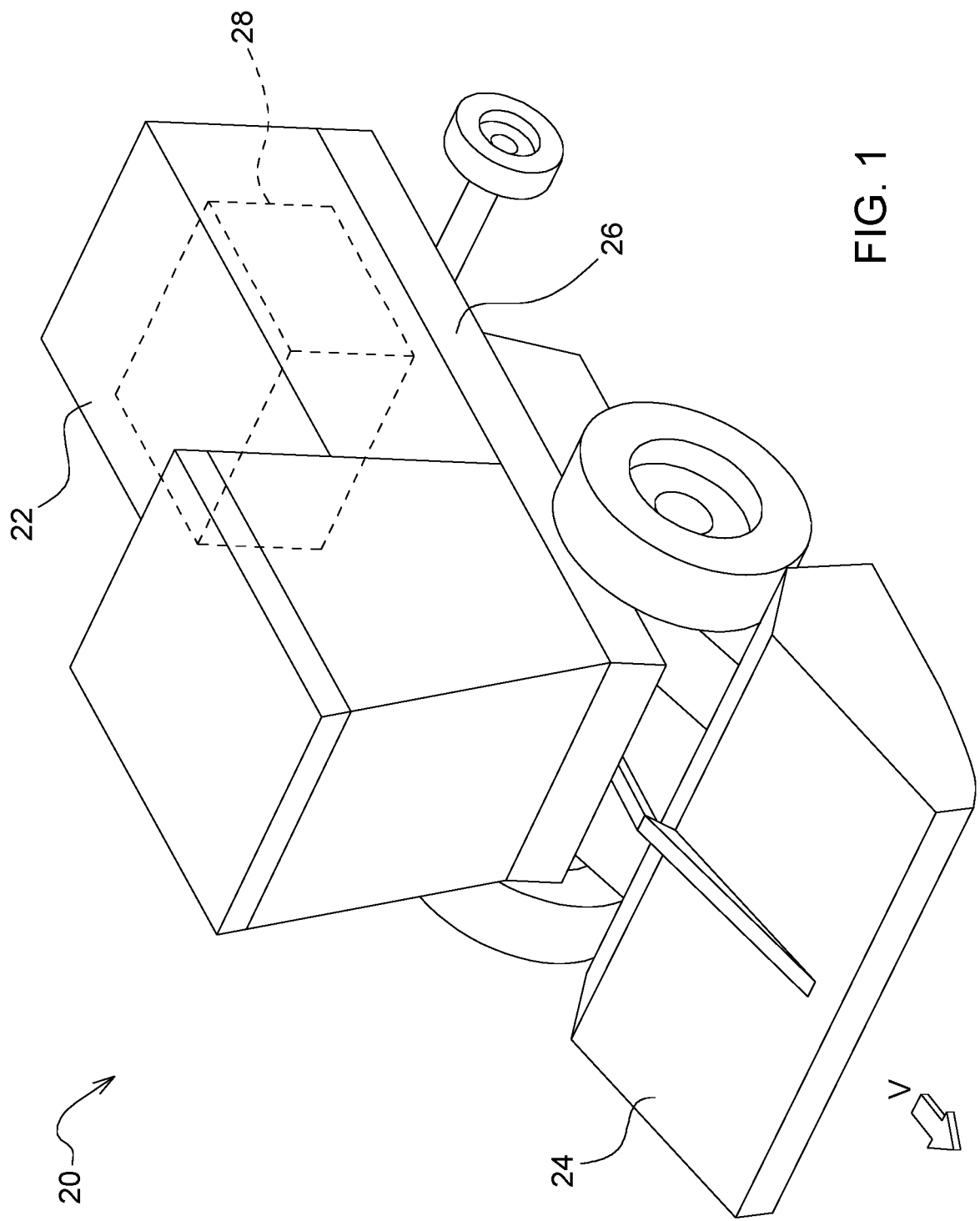
FIG. 1 is a schematic perspective view of an agricultural machine.

Referring to the Figures, wherein like numerals indicate like parts throughout the several views, an agricultural machine is generally shown at 20 in FIG. 1. The example embodiment of the agricultural machine 20 shown in FIGS. 1 and 2 includes a self-propelled windrower having a traction unit 22 and a header 24 attached to the traction unit 22. However, it should be appreciated that the teachings of this disclosure may be applied to machines other than the example windrower depicted in FIGS. 1 and 2.

Referring to FIG. 1, the agricultural machine 20 includes a frame 26, which supports a prime mover 28. The prime mover 28 may include, but is not limited to, an internal combustion engine, an electric motor, a combination of both, or some other device capable of generating torque to power the agricultural machine 20 and systems thereof.

Figure 2:
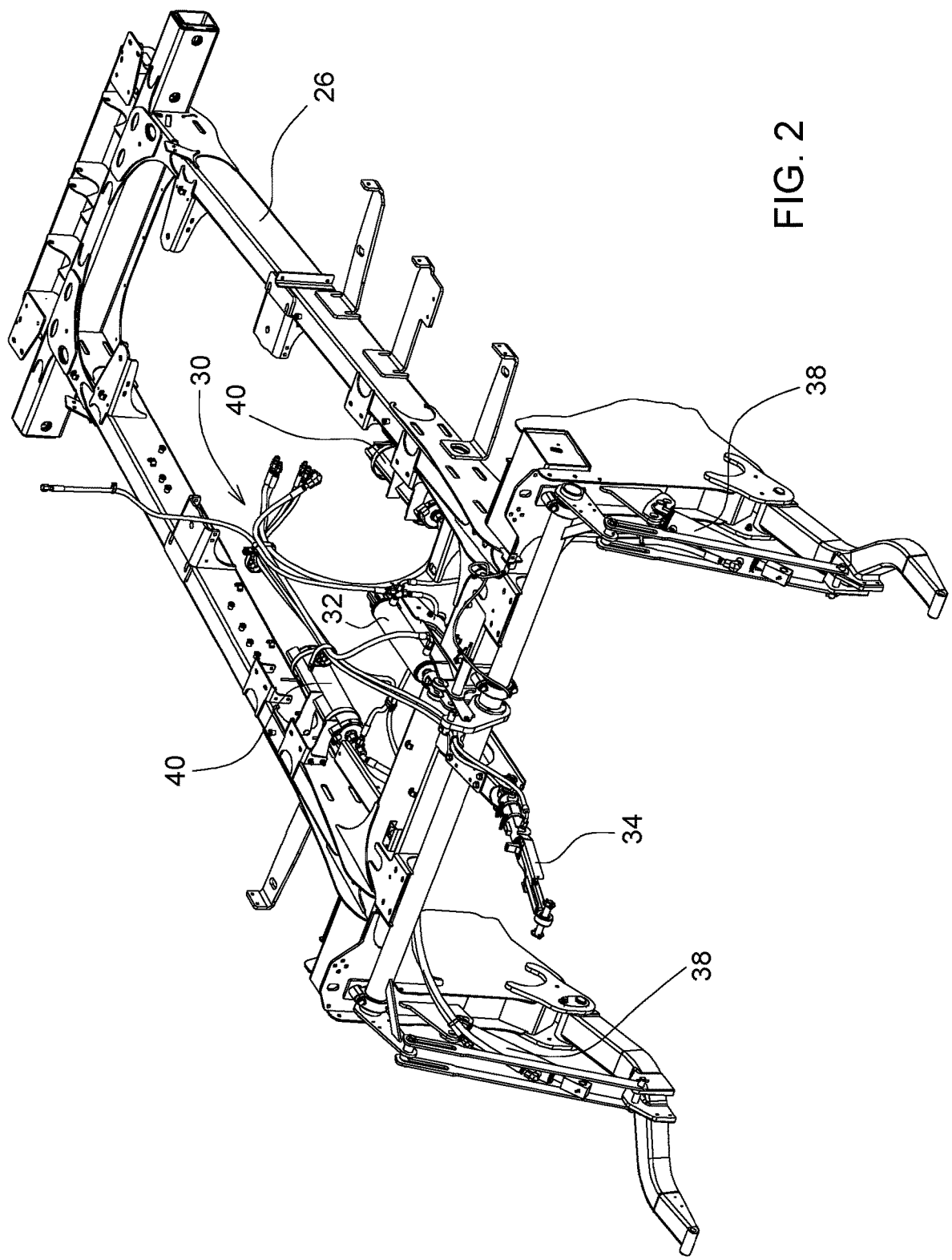
FIG. 2 is a schematic partial perspective view of a frame and a hydraulic system of the agricultural machine.

The agricultural machine 20 includes a hydraulic system 30. Referring to FIG. 2, the example embodiment of the hydraulic system 30 includes a first actuator 32 having a first required flow rate to perform a first function, and a second actuator 34 having a second required flow rate to perform a second function. In the example embodiment shown in the Figures and described herein, the first function of the first actuator 32 includes lifting the header 24. The first actuator 32 is a single acting hydraulic cylinder, in which fluid pressure may be applied to and/or released from only one side of the first actuator 32 to control the movement thereof. As such, fluid pressure may be applied to the first actuator 32 to lift the header 24, and the weight of the header 24 may be used to lower itself when the fluid pressure is released. In the example embodiment shown in the Figures and described herein, the second function of the second actuator 34 includes tilting the header 24. The second actuator 34 is a double acting hydraulic cylinder, in which fluid pressure may be applied to and released from both sides of the second actuator 34 to control the movement thereof. As such, fluid pressure may be applied to either side of the second actuator 34 and simultaneously released from the other side of the second actuator 34 to control movement of the second actuator 34.

The first required flow rate for the first actuator 32 is greater than the second required flow rate for the second actuator 34. In the example embodiment described herein, the first required flow rate to lift the header 24 may be approximately equal to 33 cc, whereas the second required flow rate to tilt the header 24 may be approximately equal to 5 cc.

The exemplary embodiment of the hydraulic system 30 further includes a third actuator system 36. The third actuator system 36 is a header 24 float system, which includes a pair of third actuators 38. Each of the third actuators 38 include a single acting hydraulic cylinder coupled to respective fluid accumulator 40. Each of the third actuators 38 is attached to a respective lift arm of the frame 26. The third actuator system 36 enables the header 24 to float on the ground during operation as is understood by those skilled in the art.

Figure 3:
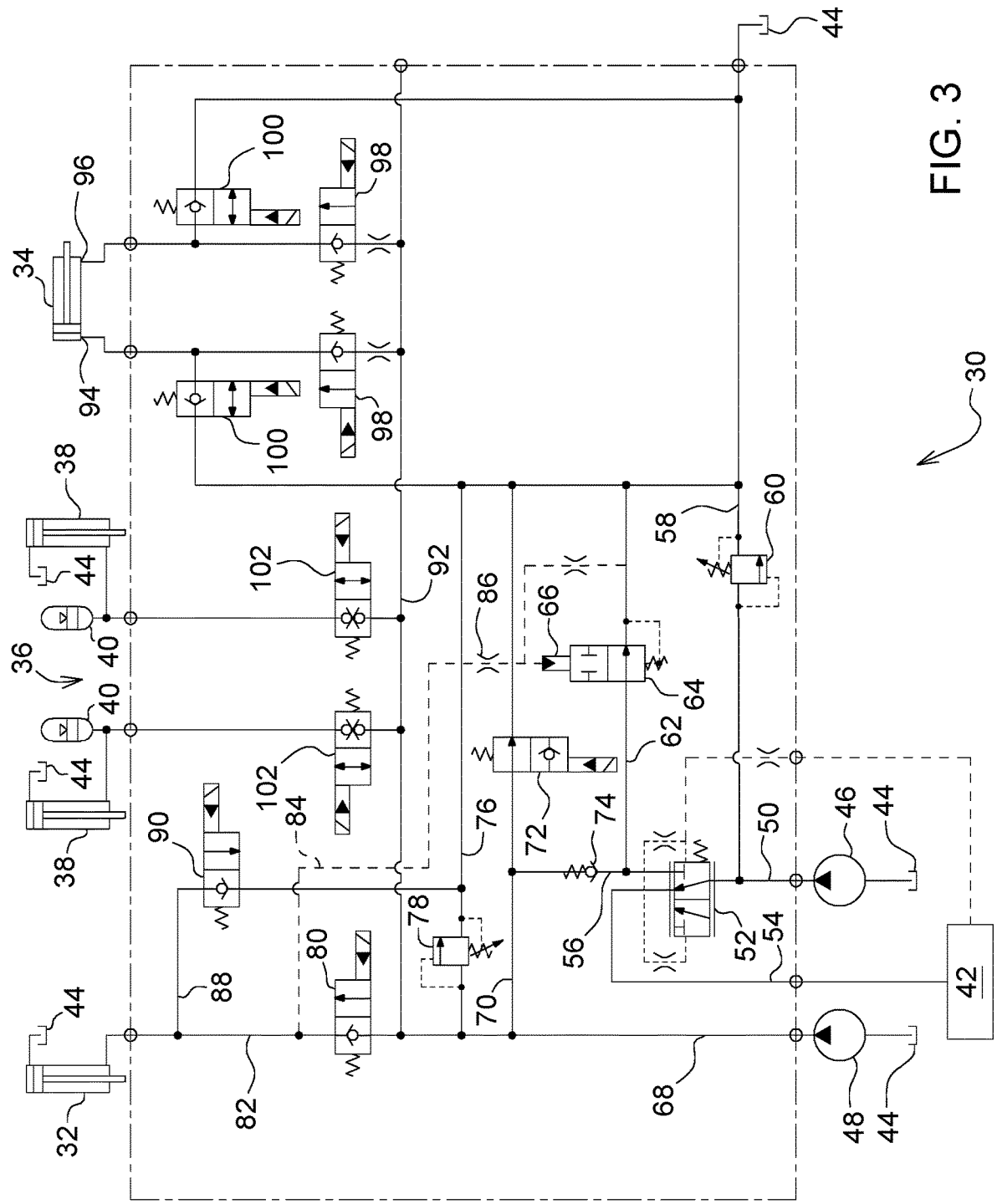
FIG. 3 is a schematic fluid circuit diagram of the hydraulic system in a normal state.

Referring to FIG. 3, the hydraulic system 30 is shown schematically using standard American National Standards Institute (ANSI) hydraulic symbols to represent the various components of the example hydraulic system 30 therein. The hydraulic system 30 further includes a priority fluid circuit 42. The priority fluid circuit 42 directs pressurized fluid from the hydraulic system 30 to other portions and/or systems of the agricultural machine 20 not described herein.

The hydraulic system 30 further includes a tank 44. For clarity, connections to the tank 44 are shown individually. It should be appreciated that the hydraulic system 30 further includes a plurality of fluid flow pathways, which may include but are not limited to fluid passages, fluid lines, connections, fittings, etc., which connect the various features and/or components of the hydraulic system 30 in fluid communication as represented in FIG. 3. The fluid flow pathways necessary for an understanding of the disclosure are specifically identified by number. However, other fluid flow pathways that are not necessary for an understanding of the disclosure, and which are otherwise understood by those skilled in the art based on the diagram of FIG. 3, are not specifically identified by number.

The hydraulic system 30 includes a first fixed displacement pump 46 having a first pump output, and a second fixed displacement pump 48 having a second pump output. The first pump output is greater than the second pump output. In the example embodiment described herein, the first pump output is approximately equal to 23 cc, and the second pump output is approximately equal to 10 cc. The first fixed displacement pump 46 and the second fixed displacement pump 48 are powered by torque from the prime mover 28. As is understood by those skilled in the art, a fixed displacement pump is a hydraulic pump that is a positive displacement type where the amount of displacement (e.g., gpm or lpm) cannot be varied for a given rotational speed or working pressure. As such, both the first fixed displacement pump 46 and the second fixed displacement pump 48 are not variable displacement pumps, and their respective outputs, i.e., the first pump output and the second pump output cannot be varied.

As noted above, in the example embodiment described herein, the first required flow rate to lift the header 24 may be approximately equal to 33 cc, whereas the second required flow rate to tilt the header 24 may be approximately equal to 5 cc. As such, the first required flow rate, e.g., 33 cc is greater than the second pump output, e.g., 10 cc. In contrast, the second required flow rate, e.g., 5 cc is less than the second pump output, e.g., 10 cc.

A first pump outlet fluid passage 50 is connected to and receives fluid flow from the first fixed displacement pump 46. A priority circuit control valve 52 is disposed downstream of the first fixed displacement pump 46, with the first pump outlet fluid passage 50 extending between and connecting the first fixed displacement pump 46 and the priority circuit control valve 52. A priority fluid passage 54 connects the priority circuit control valve 52 and the priority fluid circuit 42. A first pump supply line 56 connects the priority circuit control valve 52 with the other components of the hydraulic system 30. In the example embodiment shown in the Figures and described herein, because the priority fluid circuit 42 is supplied by only the first fixed displacement pump 46, the second fixed displacement pump 48 does not need to operate in order to provide the fluid flow to the priority fluid circuit 42. Therefore, the power required to supply the priority fluid circuit 42 is reduced when compared to a single fixed displacement pump system.

The priority circuit control valve 52 is a variable position control valve moveable between a first state and a second state. When the priority circuit control valve 52 is disposed in its first state, the priority circuit control valve 52 connects fluid communication between the first fixed displacement pump 46 and the priority fluid passage 54 and disconnects fluid communication between the first fixed displacement pump 46 and the first pump supply line 56. As such, when the priority circuit control valve 52 is disposed in its first state, the first pump output is directed to the priority fluid circuit 42, and is not available to the first actuator 32, the second actuator 34, and/or the third actuator system 36. When the priority circuit control valve 52 is disposed in its second state, the priority circuit control valve 52 connects fluid communication between the first fixed displacement pump 46 and the first pump supply line 56 and disconnects fluid communication between the first fixed displacement pump 46 and the priority fluid passage 54. As such, when the priority circuit control valve 52 is disposed in its second state, the first pump output is available to the first actuator 32, the second actuator 34, and/or the third actuator system 36.

A first pressure relief line 58 connects the first pump outlet fluid passage 50 and the tank 44 in fluid communication. A first pressure relief valve 60 is disposed in the first pressure relief line 58. The first pressure relief valve 60 is operable to dump fluid from the first fixed displacement pump 46 to the tank 44 when the fluid pressure within the first pressure relief line 58 is greater than a set pressure value.

A first pump exhaust line 62 is connected to and connects the first pump supply line 56 to the tank 44. A combined flow control valve 64 is disposed within the first pump exhaust line 62. The combined flow control valve 64 is controllable between a first state and a second state. In the embodiment shown in FIG. 3 and described herein, the combined flow control valve 64 includes a hydraulic actuated pilot 66 that is operable to move the combined flow control valve 64 between its first state and its second state.

When the combined flow control valve 64 is disposed in its first state, the combined flow control valve 64 is configured to separate the first pump output and the second pump output, such that only the second pump output may be directed to the second actuator 34 to provide the second required flow rate for the second function of the second actuator 34. In the example embodiment shown in the Figures and described herein, when the combined flow control valve 64 is disposed in its first state, the combined flow control valve 64 connects fluid communication between the first fixed displacement pump 46 and the tank 44 so that the first pump output is directed to the tank 44, and is not available to operate the first actuator 32, the second actuator 34, and/or the third actuator system 36.

When the combined flow control valve 64 is disposed in its second state, the combined flow control valve 64 is configured to combine the first pump output and the second pump output, such that the combined first pump output and the second pump output may be directed to the first actuator 32 to provide the first required flow rate for the first function of the first actuator 32. In the example embodiment shown in the Figures and described herein, when the combined flow control valve 64 is disposed in its second state the combined flow control valve 64 disconnects or blocks fluid communication between the first fixed displacement pump 46 and the tank 44 so that the first pump output is available to operate the first actuator 32, the second actuator 34, and/or the third actuator system 36.

A second pump outlet fluid passage 68 is connected to and receives fluid flow from the second fixed displacement pump 48. A second pump exhaust line 70 connects the second pump outlet fluid passage 68 and the tank 44. A second pump exhaust valve 72 is disposed within the second pump exhaust line 70. The second pump exhaust valve 72 is controllable between a first state and a second state. When the second pump exhaust valve 72 is disposed in its first state, the second pump exhaust valve 72 connects fluid communication between the second fixed displacement pump 48 and the tank 44. When the second pump exhaust valve 72 is disposed in its second state, the second pump exhaust valve 72 blocks fluid communication between the second fixed displacement pump 48 and the tank 44 in a direction moving from the second fixed displacement pump 48 toward the tank 44.

The first pump supply line 56 connects the priority circuit control valve 52 and the second pump exhaust line 70. The first pump supply line 56 connects to the second pump exhaust line 70 at a location disposed between the second pump outlet fluid passage 68 and the second pump exhaust valve 72. A flow control valve 74 is disposed in the first pump supply line 56, between the first pump exhaust line 62 and the second pump exhaust line 70. As such, the flow control valve 74 is disposed between the first fixed displacement pump 46 and the first actuator 32. The flow control valve 74 is operable to allow fluid flow in a direction moving from the first fixed displacement pump 46 toward the first actuator 32, and block fluid flow in a direction moving from the first actuator 32 toward the first fixed displacement pump 46. The flow control valve 74 may include, but is not limited to, a check valve, a pilot operated valve, an electrically operated directional control valve, a needle valve, or some other type of device that allows fluid flow in one direction while blocking it in the opposite direction.

A second pressure relief line 76 connects the second pump outlet fluid passage 68 and the tank 44 in fluid communication. A second pressure relief valve 78 is disposed in the second pressure relief line 76. The second pressure relief valve 78 is operable to dump fluid from the second fixed displacement pump 48, and under certain operating conditions the fluid from the combination of the second fixed displacement pump 48 and the first fixed displacement pump 46, to the tank 44 when the fluid pressure within the second pressure relief line 76 is greater than a set pressure value.

A first actuator apply valve 80 is disposed in communication with the second pump outlet fluid passage 68, between the second fixed displacement pump 48 and the first actuator 32. The first actuator apply valve 80 is controllable between a first state and a second state. When the first actuator apply valve 80 is disposed in its first state, the first actuator apply valve 80 blocks fluid communication in a direction moving from the second fixed displacement pump 48 toward the first actuator 32. When the first actuator apply valve 80 is disposed in its second state, the first actuator apply valve 80 connects or allows fluid communication between the second fixed displacement pump 48 and the first actuator 32.

A first actuator supply fluid passage 82 interconnects the first actuator apply valve 80 and the first actuator 32. A pilot supply line 84 interconnects the fluid passage and the hydraulic actuated pilot 66 of the combined flow control valve 64. When the first actuator apply valve 80 is disposed in its second state allowing fluid communication between the second fixed displacement pump 48 and the first actuator 32, a portion of the second pump output flows through the pilot supply line 84 to the hydraulic actuated pilot 66 of the combined flow control valve 64 to actuate the combined flow control valve 64 into its second state. When the combined flow control valve 64 is disposed in its second state, the combined flow control valve 64 closes fluid communication to the tank 44, which drives the fluid from the first fixed displacement pump 46 through the flow control valve 74, thereby allowing the first pump output to combine with the second pump output in order to supply the full first required flow rate to the first actuator 32.

A flow controller 86 may be disposed within one of the pilot supply line 84 or the combined flow control valve 64. The flow controller 86 may include but is not limited to, one of an orifice restriction, a variable flow proportional valve, a needle valve, a relief valve, or some other device capable of restricting fluid flow. The flow controller 86 restricts fluid flow to the hydraulic actuated pilot 66 of the combined flow control valve 64, to slow the rate at which the hydraulic actuated pilot 66 engages or moves the combined flow control valve 64 from its first state to its second state. Slowing the rate at which the combined flow control valve 64 is actuated ramps up the flow rate to the first actuator 32 over a defined period of time to limit or reduce a jump, jerk, or surge while executing the first function. For example, in the example embodiment described herein, slowing or controlling the rate at which the combined flow control valve 64 is moved from its first state to its second state limits the potential surge or shock that the agricultural machine 20 may experience when lifting the header 24.

A first actuator return line 88 interconnects the first actuator supply fluid passage 82 and the second pressure relief line 76. The first actuator return line 88 connects to the first actuator supply fluid passage 82 at a location between the pilot supply line 84 and the first actuator 32. The first actuator return line 88 connects to the second pressure relief line 76 downstream of the second pressure relief valve 78, between the second pressure relief valve 78 and the tank 44.

A first actuator release valve 90 is disposed within the first actuator return line 88. The first actuator release valve 90 is controllable between a first state and a second state. When the first actuator release valve 90 is disposed in the first state, the first actuator release valve 90 blocks fluid flow in a direction moving from the first actuator 32 toward the second pressure relief line 76. When the first actuator release valve 90 is disposed in its second state, the first actuator release valve 90 connects fluid communication between the first actuator 32 and the second pressure relief line 76.

A downstream actuator supply line 92 is connected to the second pump outlet fluid passage 68, between the second pressure relief line 76 and the first actuator apply valve 80. The downstream actuator supply line 92 supplies fluid flow to the second actuator 34 and the third actuator system 36.

As noted above, the example embodiment described herein and shown in FIG. 3 is a double acting hydraulic cylinder, which includes a first port 94 and a second port 96. Each of the first port 94 and the second port 96 include a respective second actuator apply valve 98 and a second actuator release valve 100 for controlling the position and/or operation of the second actuator 34. Each respect second actuator apply valve 98 is disposed in communication with the downstream actuator supply line 92, and is controllable between a first state and a second state. When each respective second actuator apply valve 98 is disposed in its first state, the respective second actuator apply valve 98 blocks fluid communication in a direction moving from the downstream actuator supply line 92 toward the second actuator 34. When each respective second actuator apply valve 98 is disposed in its second state, the respective second actuator apply valve 98 connects or allows fluid communication between the downstream actuator supply line 92 and the second actuator 34. Each respect second actuator release valve 100 is disposed in communication with the tank 44 and is controllable between a first state and a second state. When each respective second actuator release valve 100 is disposed in its first state, the respective second actuator release valve 100 blocks fluid communication in a direction moving from the second actuator 34 toward the tank 44. When each respective second actuator release valve 100 is disposed in its second state, the respective second actuator release valve 100 connects or allows fluid communication between the second actuator 34 and the tank 44.

As described above, the third actuator system 36 includes a pair of third actuators 38, with each respective third actuator 38 connected to a respective fluid accumulator 40. Each respective third actuator 38 is controlled by a respective third actuator apply valve 102. Each respect third actuator apply valve 102 is disposed in communication with the downstream actuator supply line 92, and is controllable between a first state and a second state. When each respective third actuator apply valve 102 is disposed in its first state, the respective third actuator apply valve 102 blocks disconnects or blocks fluid communication between the downstream actuator supply line 92 and their respective third actuator 38. When each respective third actuator apply valve 102 is disposed in its second state, the respective third actuator apply valve 102 connects or allows fluid communication between the downstream actuator supply line 92 and the third actuator 38.

Figure 4:
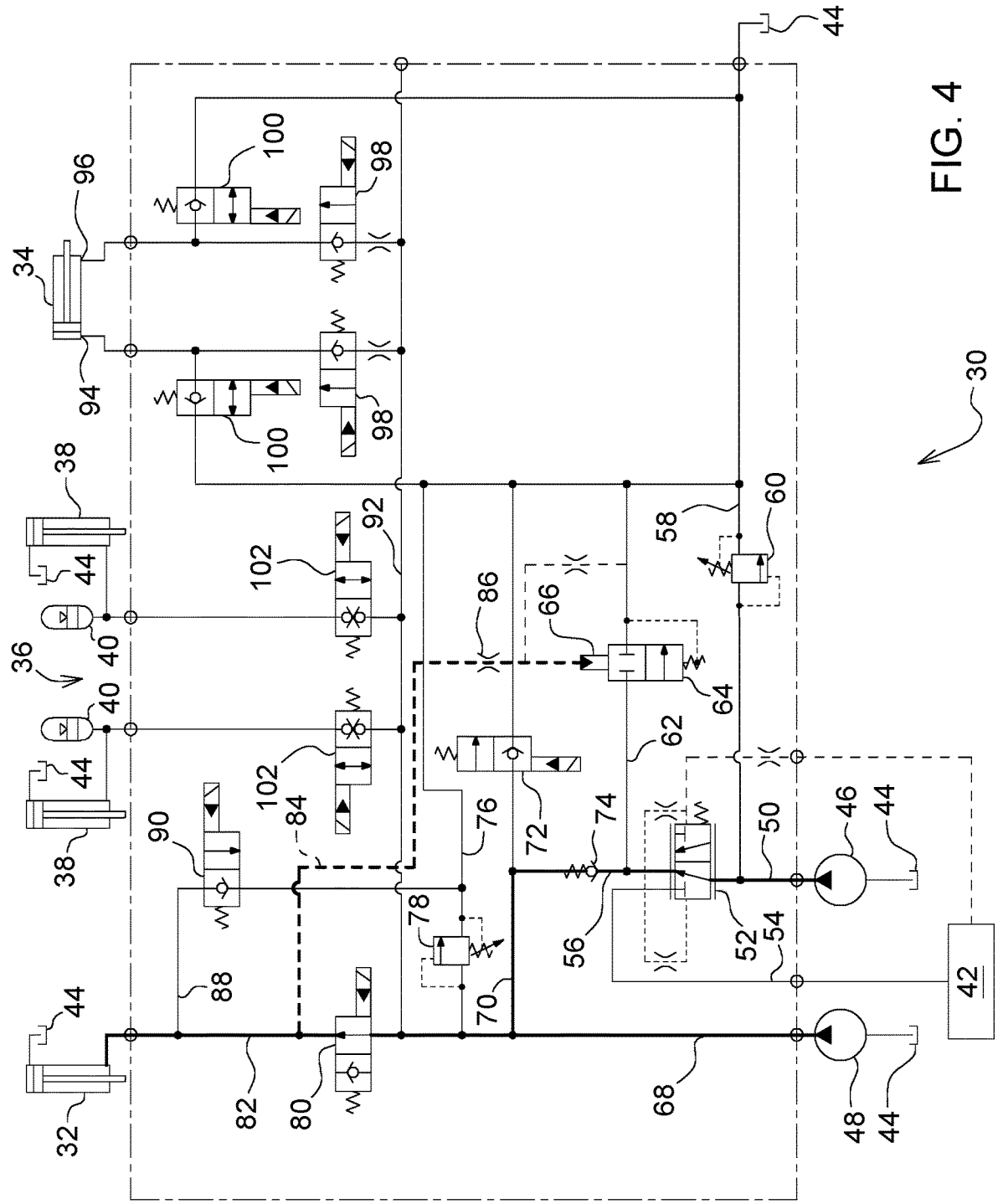
FIG. 4 is a schematic fluid circuit diagram of the hydraulic system configured to direct fluid from both a first fixed displacement pump and a second displacement pump to a first actuator.

Referring to FIG. 4, the hydraulic system 30 is shown configured to direct the first pump output and the second pump output to the first actuator 32 to provide the first required flow rate for the first function of the first actuator 32. As shown in FIG. 4, the first pump output and the second pump output, i.e., the fluid flow from the first fixed displacement pump 46 and the second fixed displacement pump 48 respectively, are generally represented by the thickened line segments. The priority circuit control valve 52 is disposed in its second state, the second pump exhaust valve 72 is disposed in its second state, and the first actuator apply valve 80 is disposed in its second state. Because the first actuator apply valve 80 is disposed in its second state, a portion of the fluid flow from the second fixed displacement pump 48 may flow through the pilot supply line 84 to the hydraulic actuated pilot 66 of the combined flow control valve 64, to move the combined flow control valve 64 into its second state as shown in FIG. 4. Accordingly, the fluid flow from both the first fixed displacement pump 46 and the second fixed displacement pump 48 is available to the first actuator 32. In the example embodiment described herein, the first required fluid flow is approximability equal to 33 cc, the first pump output is approximately equal to 23 cc, and the second pump output is approximately equal to 10 cc. Accordingly, the combined flow of the first pump output and the second pump output is approximately equal to 33 cc, which satisfied the first required fluid flow of the first actuator 32.

Figure 5:
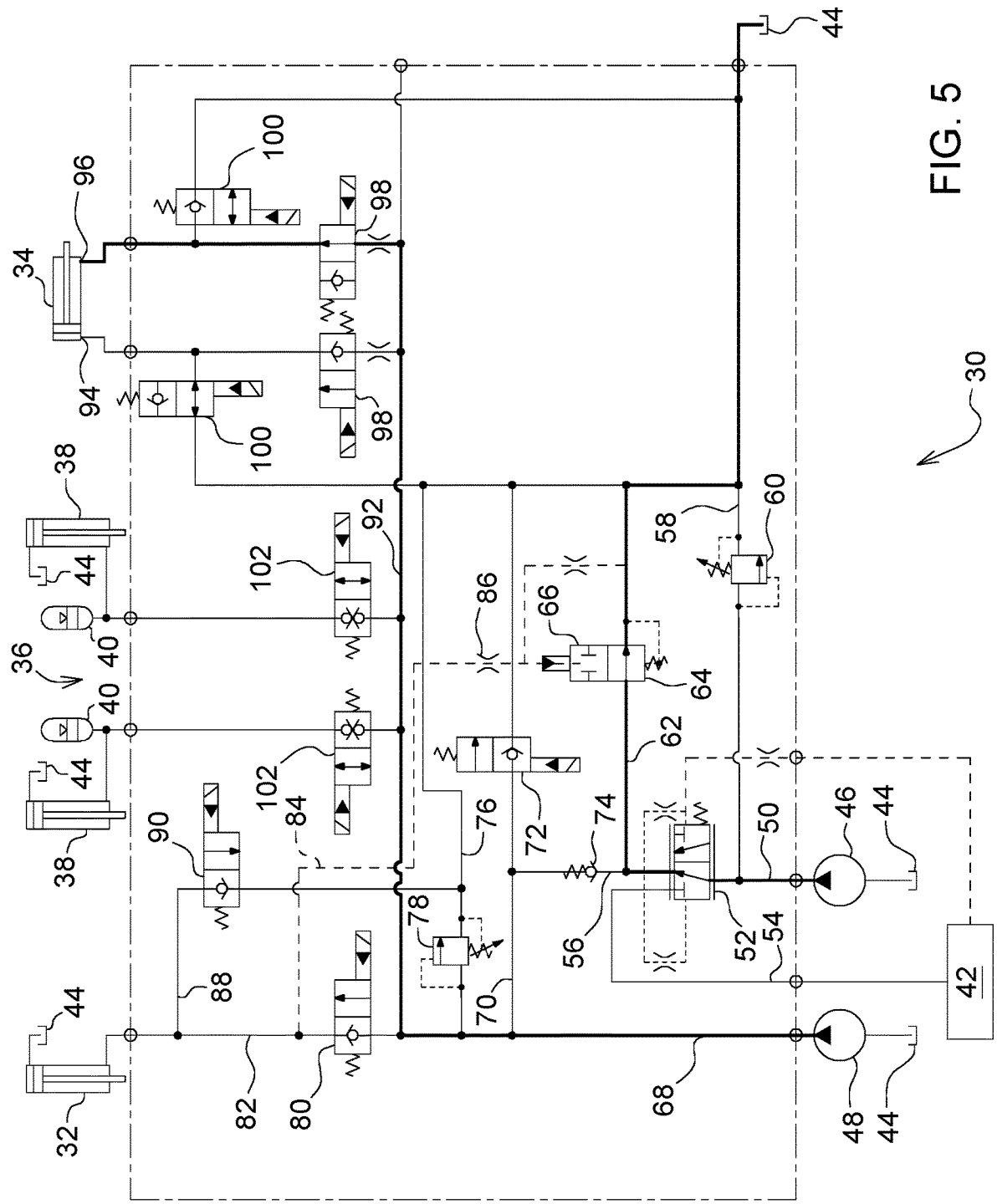
FIG. 5 is a schematic fluid circuit diagram of the hydraulic system configured to direct fluid from only the second fixed displacement pump to a second actuator.

Referring to FIG. 5, the hydraulic system 30 is shown configured to direct the second pump output to the second actuator 34 to provide the second required flow rate for the second function of the second actuator 34 and direct the first pump output to the tank 44. As shown in FIG. 5, the first pump output and the second pump output, i.e., the fluid flow from the first fixed displacement pump 46 and the second fixed displacement pump 48 respectively, are generally represented by the thickened line segments. The second pump exhaust valve 72 is disposed in its second state, such that the second pump output is directed through the downstream actuator supply line 92, and to the second actuator 34. In the example embodiment described herein, the second required flow rate is approximately equal to 5 cc, whereas the second pump output is approximately equal to 10 cc. Accordingly, approximability 5 cc of the second pump output is used to supply the second required flow rate of the second actuator 34, and the remainder of the second pump output is forced through the second pressure relief valve 78 to the tank 44. The priority circuit control valve 52 is disposed in its second state, and the combined flow control valve 64 is disposed in its first state, such that the entirety of the first pump output is directed to the tank 44, and is not forced through a pressure relief valve, thereby reducing the energy requirements for the system.

Figure 6:
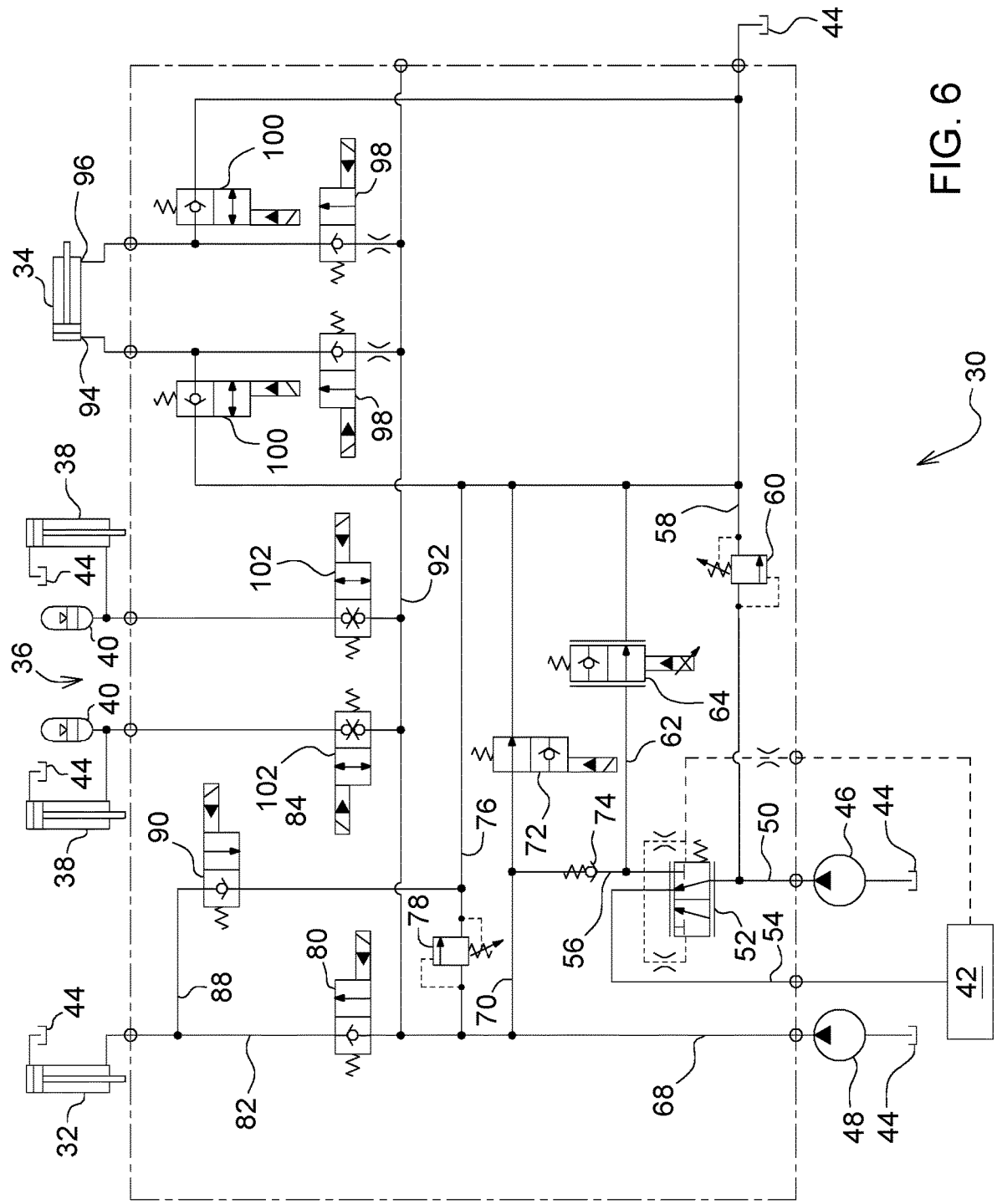
FIG. 6 is a schematic fluid circuit diagram of an alternative embodiment of the hydraulic circuit.

Referring to FIG. 6, an alternative embodiment of the fluid circuit is shown. The embodiment of FIG. 6 is similar to the embodiment shown in FIG. 3. The difference being that the alternative embodiment shown in FIG. 6 includes the combined flow control valve 64 embodied as a variable electro/hydraulic controlled position valve. As such, the variable electro/hydraulic controlled position valve may be electronically controlled to ramp up or control the speed at which the combined flow control valve 64 is switched from its first state to its second state. As such, the alternative embodiment shown in FIG. 6 eliminates the pilot supply line 84 and the flow controller 86 shown in FIG. 3.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A hydraulic system for a machine, the hydraulic system comprising:
   a first fixed displacement pump having a first pump output;
   a second fixed displacement pump having a second pump output;
   wherein the first pump output is greater than the second pump output;
   a first actuator having a first required flow rate to perform a first function;
   a second actuator having a second required flow rate to perform a second function, wherein the first required flow rate is greater than the second required flow rate;
   a combined flow control valve controllable between a first state and a second state;
   wherein the combined flow control valve is configured to separate the first pump output and the second pump output when the combined flow control valve is disposed in the first state, such that only the second pump output is directed to the second actuator to provide the second required flow rate for the second function of the second actuator; and
   wherein the combined flow control valve is configured to combine the first pump output and the second pump output when the combined flow control valve is disposed in the second state, such that the combined first pump output and the second pump output is directed to the first actuator to provide the first required flow rate for the first function of the first actuator.

2. The hydraulic system set forth in claim 1, further comprising a tank.

3. The hydraulic system set forth in claim 2, wherein the combined flow control valve connects fluid communication between the first fixed displacement pump and the tank when the combined flow control valve is disposed in the first state, and wherein the combined flow control valve disconnects fluid communication between the first fixed displacement pump and the tank when the combined flow control valve is disposed in the second state.

4. The hydraulic system set forth in claim 3, further comprising a first actuator apply valve disposed between the second fixed displacement pump and the first actuator, wherein the first actuator apply valve is controllable between a first state blocking fluid communication in a direction moving from the second fixed displacement pump toward the first actuator, and a second state allowing fluid communication between the second fixed displacement pump and the first actuator.

5. The hydraulic system set forth in claim 4, wherein the combined flow control valve includes a hydraulic actuated pilot.

6. The hydraulic system set forth in claim 5, further comprising a fluid passage interconnecting the first actuator apply valve and the first actuator, and a pilot supply line interconnecting the fluid passage and the hydraulic actuated pilot of the combined flow control valve, whereby a portion of the second pump output flows through the pilot supply line to the hydraulic actuated pilot of the combined flow control valve to actuate the combined flow control valve into the second state of the combined flow control valve when the first actuator apply valve is disposed in the second state of the first actuator apply valve, thereby allowing the first pump output to combine with the second pump output.

7. The hydraulic system set forth in claim 6, further comprising a flow controller disposed within one of the pilot supply line and the combined flow control valve.

8. The hydraulic system set forth in claim 7, wherein the flow controller includes an orifice restriction.

9. The hydraulic system set forth in claim 3, further comprising a flow control valve disposed between the first fixed displacement pump and the first actuator, wherein the flow control valve is operable to allow fluid flow in a direction moving from the first fixed displacement pump toward the first actuator, and wherein the flow control valve is operable to block fluid flow in a direction moving from the first actuator toward the first fixed displacement pump.

10. The hydraulic system set forth in claim 2, further comprising a second pump exhaust valve controllable between a first state connecting fluid communication between the second fixed displacement pump and the tank, and a second state blocking fluid communication between the second fixed displacement pump and the tank in a direction moving from the second fixed displacement pump toward the tank.

11. The hydraulic system set forth in claim 1, wherein the combined flow control valve includes a variable electro/hydraulic controlled position valve.

12. The hydraulic system set forth in claim 1, wherein the first required flow rate is greater than the second pump output, and wherein the second required flow rate is less than the second pump output.

13. The hydraulic system set forth in claim 1, wherein the combined flow control valve is a variable flow control valve.

14. A hydraulic system for an agricultural machine, the hydraulic system comprising:
a tank operable to store a fluid;
a first fixed displacement pump having a first pump output;
a second fixed displacement pump having a second pump output;
a first actuator having a first required flow rate to perform a first function;
a second actuator having a second required flow rate to perform a second function, wherein the first required flow rate is greater than the second required flow rate;
a combined flow control valve controllable between a first state and a second state;

wherein the combined flow control valve connects fluid communication between the first fixed displacement pump and the tank when the combined flow control valve is disposed in the first state, to direct the first pump output to the tank so that only the second pump output is directed to the second actuator to provide the second required flow rate for the second function of the second actuator;

wherein the combined flow control valve disconnects fluid communication between the first fixed displacement pump and the tank when the combined flow control valve is disposed in the second state to combine the first pump output and the second pump output such that the combined first pump output and the second pump output is directed to the first actuator to provide the first required flow rate for the first function of the first actuator;

a first actuator apply valve disposed between the second fixed displacement pump and the first actuator, wherein the first actuator apply valve is controllable between a first state blocking fluid communication in a direction moving from the second fixed displacement pump toward the first actuator, and a second state allowing fluid communication between the second fixed displacement pump and the first actuator; and a fluid passage interconnecting the first actuator apply valve and the first actuator, and a pilot supply line interconnecting the fluid passage and a hydraulic actuated pilot of the combined flow control valve, whereby a portion of the second pump output flows through the pilot supply line to the hydraulic actuated pilot of the combined flow control valve to actuate the combined flow control valve into the second state of the combined flow control valve when the first actuator apply valve is disposed in the second state of the first actuator apply valve, thereby allowing the first pump output to combine with the second pump output.

15. The hydraulic system set forth in claim 14, further comprising an orifice restriction disposed within the pilot supply line.

16. The hydraulic system set forth in claim 14, further comprising a flow control valve disposed between the first fixed displacement pump and the first actuator, wherein the flow control valve is operable to allow fluid flow in a direction moving from the first fixed displacement pump toward the first actuator, and wherein the flow control valve is operable to block fluid flow in a direction moving from the first actuator toward the first fixed displacement pump.

17. The hydraulic system set forth in claim 14, further comprising a second pump exhaust valve controllable between a first state connecting fluid communication between the second fixed displacement pump and the tank, and a second state blocking fluid communication between the second fixed displacement pump and the tank in a direction moving from the second fixed displacement pump toward the tank.

18. A windrower comprising:
a frame;
a prime mover operable to generate a torque;
a hydraulic system including:
a tank operable to store a fluid;
a first fixed displacement pump having a first pump output;
a second fixed displacement pump having a second pump output;
a first actuator having a first required flow rate to perform a first function;

a second actuator having a second required flow rate to perform a second function, wherein the first required flow rate is greater than the second required flow rate;

a combined flow control valve controllable between a first state and a second state;

wherein the combined flow control valve connects fluid communication between the first fixed displacement pump and the tank when the combined flow control valve is disposed in the first state of the combined flow control valve, to direct the first pump output to the tank so that only the second pump output is directed to the second actuator to provide the second required flow rate for the second function of the second actuator;

wherein the combined flow control valve disconnects fluid communication between the first fixed displacement pump and the tank when the combined flow control valve is disposed in the second state of the combined flow control valve to combine the first pump output and the second pump output such that the combined first pump output and the second pump output is directed to the first actuator to provide the first required flow rate for the first function of the first actuator;

a first actuator apply valve disposed between the second fixed displacement pump and the first actuator, wherein the first actuator apply valve is controllable between a first state blocking fluid communication in a direction moving from the second fixed displacement pump toward the first actuator, and a second state allowing fluid communication between the second fixed displacement pump and the first actuator;

a fluid passage interconnecting the first actuator apply valve and the first actuator, and a pilot supply line interconnecting the fluid passage and a hydraulic actuated pilot of the combined flow control valve, whereby a portion of the second pump output flows through the pilot supply line to the hydraulic actuated pilot of the combined flow control valve to actuate the combined flow control valve into the second state of the combined flow control valve when the first actuator apply valve is disposed in the second state of the first actuator apply valve, thereby allowing the first pump output to combine with the second pump output;

an orifice restriction disposed within the pilot supply line;

a check valve disposed between the first fixed displacement pump and the first actuator, wherein the check valve is operable to allow fluid flow in a direction moving from the first fixed displacement pump toward the first actuator, and wherein the check valve is operable to block fluid flow in a direction moving from the first actuator toward the first fixed displacement pump; and a second pump exhaust valve controllable between a first state connecting fluid communication between the second fixed displacement pump and the tank, and a second state blocking fluid communication between the second fixed displacement pump and the tank in a direction moving from the second fixed displacement pump toward the tank.

\* \* \* \* \*